Patented Oct. 10, 1950

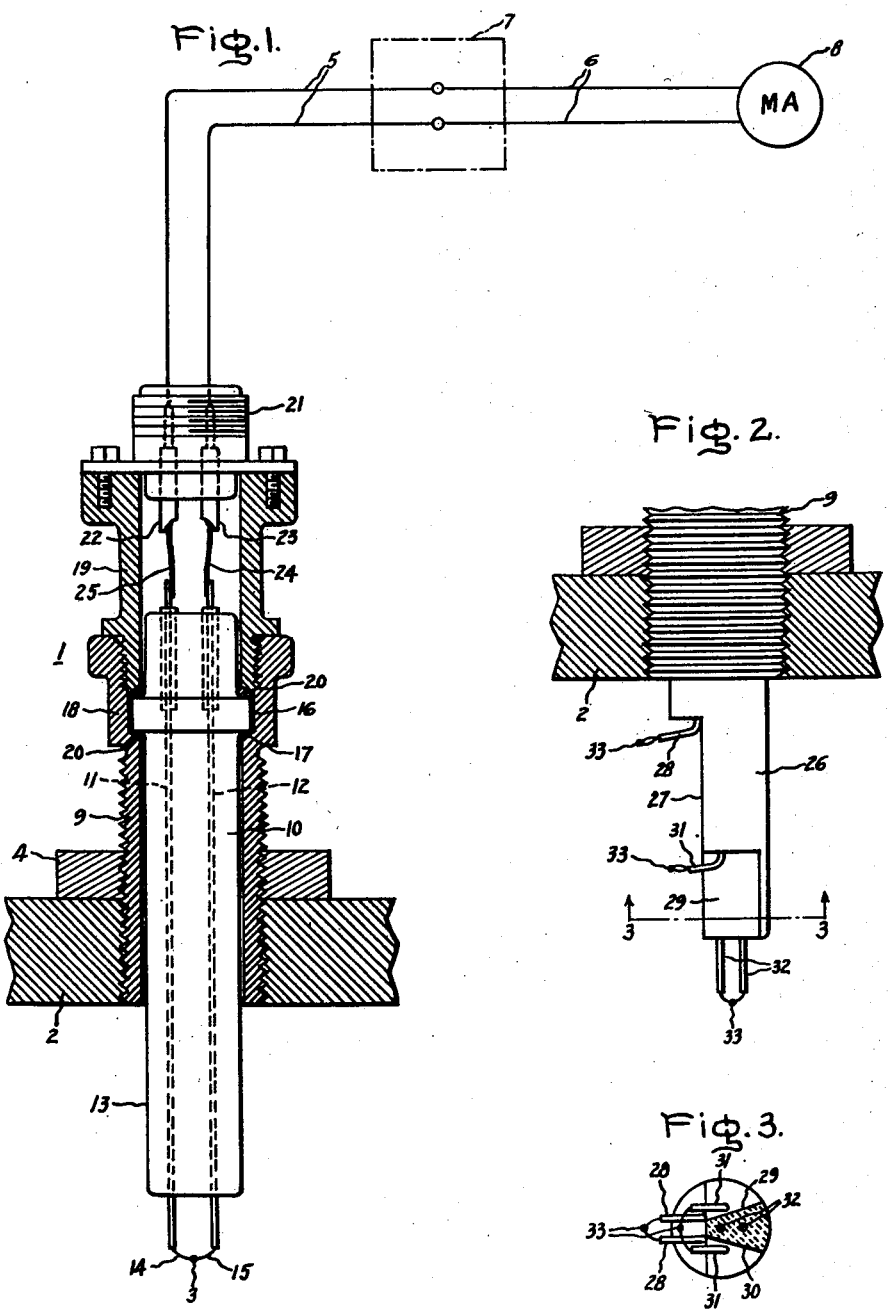

2,525,439

UNITED STATES PATENT OFFICE 2,525,439

THERMOCOUPLE

Roy W. Abbott, Schenectady, N. Y., assignor to General Electric Company, a corporation of New York Application March 29, 1949, Serial No. 84,154

1 Claim. (Cl. 136—4)

My invention relates to improvements in thermocouples and has particular reference to thermocouple installations for measuring temperatures of combustion gases.

Thermocouples have been commonly used for measuring temperatures, the electromotive force generated at the junction of two dissimilar conductors being readily measured by well-known means such as galvanometers or potentiometers. Where both economy and speed of thermal response are important considerations, problems have arisen in the design and use of thermocouples. These problems are amplified in installations where the temperatures of hot gases such as gases of combustion are to be measured, especially when the thermocouple assembly is subject to vibration or high gas pressures.

Conductors comprising the thermocouple junction must have a relatively small mass in order to quickly respond to changes in temperature or to prevent cooling of the gas under test. Hence the conductors adjacent the junction necessarily have a small diameter, resulting in a fragile construction which is subject to chemical deterioration by the action of the hot combustion gases. Holding means such as enclosing tubes and ceramic spacers have been commonly used to protect the thermocouples and to facilitate installation, and in addition it has been found necessary to employ packing means to prevent the escape of the hot gases where the thermocouple and its protecting tube enter a gas-enclosing chamber, such as a combustion or exhaust chamber of an internal combustion engine or turbine. While a thermocouple is in itself relatively inexpensive, the cost is greatly increased by the addition of protecting holders and means for sealing the thermocouple assembly through a chamber wall. Maintenance costs have been reduced by using thermocouple protecting tubes which completely enclose the thermocouple junction, but such a practice impedes quick response to temperature changes.

Accordingly, it is an object of my invention to provide an improved thermocouple assembly of the nature described, which is relatively simple and inexpensive to maintain.

According to my invention thermocouple conducting bars of dissimilar metals are sealed within a ceramic core which is in turn fixed in place within a tubular metallic housing in a gas-tight relation therewith. Terminal means are provided at one end of the housing so that circuit leads may be brought to the thermocouple bars and mounting means are provided at the other end of the housing so that it may be inserted in an aperture in a gas chamber and sealed in place. The ceramic core carrying the thermocouple conducting bars extends a distance from the mounting end of the housing so that it may project into a chamber to present the ends of the conducting bars to the hot gases and at the same time shield the intermediate portions of the conducting bars. The thermocouple junctions themselves are composed of conductors having a relatively small cross-sectional area as compared with the thermocouple bars, the conductors being of dissimilar metals which are connected to the protruding ends of the corresponding conducting bars. Because of the extended portion of the ceramic core, the thermocouple bars are shielded from the hot gases and are electrically insulated from each other, as well as thermally insulated from the metal of the thermocouple housing and the chamber wall in which the housing is mounted. The thermocouple junction, being of a relatively small mass, responds quickly to temperature changes. It may be easily replaced by welding replacement couples to the ends of the relatively massive thermocouple conducting bars, which are heavy enough to withstand the deterioration by high temperatures and chemical action of the combustion gases.

In one embodiment of my invention, I provide a plurality of pairs of thermocouple bars within the ceramic core of the thermocouple assembly. Lightweight thermocouple junctions at distances along the core portion projecting into the gas chamber are provided by removing from the extended core a portion of the ceramic material so as to expose the ends of a pair of thermocouple bars. With the extended core portion thus formed, a number of thermocouple junctions are presented to the hot gases within the chamber at varying distances from the chamber wall, which is a desired condition for measuring temperature gradients as well as convenient for averaging the measurements.

For additional objects and advantages, and for a better understanding of the invention, attention is now directed to the following description and accompanying drawing, and also to the appended claim in which the features of the invention believed to be novel are particularly pointed out. In the drawings Fig. 1 shows a thermocouple assembly employing my invention; Fig. 2 is a partial view of another embodiment of my invention, and Fig. 3 is a cross-section view along 3—3 in Fig. 2.

Referring now to Fig. 1, the thermocouple assembly 1 is mounted in the wall 2 of a chamber so that the thermocouple junction 3 is exposed to hot gases of combustion or other gases. A jam nut 4 or other suitable locking means is employed to keep the mounting connection tight. A pair of conductors 5 of the same metals as the corresponding thermocouple conductors within the thermocouple assembly 1 are connected to a pair of copper or other suitable conductors 6 at a reference junction 7 whose temperature is known or can be established, as, for example, an ice bath. A milliammeter 8 is used to measure the gas temperature as represented by the thermocouple circuit current, whose magnitude is a function of the temperature difference between the thermocouple junction 3 and the reference junction 7. Of course, equivalent circuit means for measuring the thermocouple output may be substituted without departing from my invention.

The thermocouple assembly has a tubular housing 9 made of steel or other suitable material in which is fitted a ceramic core 10 which is made of porcelain or other suitable material. The core 10 is formed with two axial bores spaced from each other to accommodate a pair of thermocouple conducting bars 11 and 12. These bars consist of any pair of dissimilar metals commonly used in thermocouple pyrometry, such as Chromel, a nickel-chromium alloy, and Alumel, a nickel-aluminum alloy, which are satisfactory in measuring temperatures up to 1000° centigrade. To prevent rapid deterioration of the exposed ends of the bars, I employ relatively large conductors, about 1/16 inch diameter or larger. An extended portion 13 of the core 10 projects beyond the mounted end of the housing 9 into a gas chamber for the desired distance. Short conductors 14 and 15 of corresponding metals are welded to the projecting ends of thermocouple bars 11 and 12. The other ends of these conductors are welded together to form the thermocouple junction 3, which is readily replaceable by welding replacement conductors to the ends of bars 11 and 12. To insure a quick response to temperature changes, these conductors have a relatively small mass and for this purpose I have found .005 inch diameter wires to be satisfactory.

The thermocouple is assembled so as to prevent the escape of the gases being tested. A shoulder portion 16 located near the terminal end of the ceramic core 10 is seated against an internal shoulder 17 in the tubular housing 9. This shoulder 16 is formed by the junction of the enlarged terminal end portion 18 with remaining portion of the tubular housing. The enlarged portion is internally threaded to receive a tubing member 19 which forces the shoulder 16 of the core against the internal housing shoulder 17. Copper sealing rings 20 or other suitable packing means adjacent the ends of core shoulder 16 may be employed to prevent the escape of gases under pressure.

The thermocouple bars 11 and 12 are also sealed in place to maintain a gas tight relationship. At the terminal end of the ceramic core 9, the holes for the thermocouple bars are preferably slightly enlarged to accommodate a quantity of sodium silicate or other suitable cement which bonds the bars 11 and 12 to the core. In an embodiment of my invention constructed as described, satisfactory operation without gas leakage may be obtained with gases under pressures up to 500 pounds per square inch.

On the end of the tubular member 19 is mounted a socket 21 to provide connections to the thermocouple circuit. The socket has contact members 22 and 23 which are composed of dissimilar metals and connected by leads 24 and 25 of corresponding metals to the corresponding thermocouple bars 11 and 12 as is the usual practice in thermocouple installations. All of the thermocouple connections are preferably welded although other connecting means may be used.

In Figs. 2 and 3 I have shown another embodiment of my invention similar to that shown in Fig. 1 but having three pairs of thermocouple bars which are positioned within a ceramic core so that thermocouple junctions may be presented to the hot gases at varying distances from the chamber wall. In this embodiment the conducting bars are cemented in place in axial holes in the core and, as illustrated, one bar is positioned at the center of the core and the other five spaced at equal distances around it. The housing and connections thereto are the same as for the embodiment shown in Fig. 1. To provide means for terminating the pairs of couples at varying distances along extended core portion 26, the core is formed with a portion cut away at 27 to expose the ends of a pair of thermocouple bars 28, and further portions are cut away at 29 and 30 to expose the ends of a pair of bars 31. The ends of a third pair of bars 32 project from the bottom of the core portion 26. Each of the pairs of bars is terminated with a thermocouple junction 33 made of conductors of relatively small cross-sectional area as described in the embodiment of my invention shown in Fig. 1.

While I have found this particular method of shaping the extended core portion 26 to be a desirable one preserving the strength and ease of manufacture of the ceramic core, it is obvious that other methods of shaping the end of the core projecting from the housing may be used to expose at desired intervals any number of pairs of thermocouple bars without departing from the spirit of my invention.

With this type of thermocouple holder, the advantages of economy of replacement of the light-weight thermocouple junctions 33 are preserved so that the entire assembly need not be replaced due to the failure of the replaceable junctions. The utility of a multiple thermocouple installation is well known, and this assembly may be used for comparing temperatures at different distances from the housing wall, for obtaining an average reading, or simply for the purpose of having additional thermocouple junctions installed for use should one of the junctions fail.

While certain specific embodiments have been shown and described, it will, of course, be understood that various modifications may be made without departing from the invention. The appended claim is, therefore, intended to cover any such modifications within the true spirit and scope of the invention.

What I claim as new and desire to secure by Letters Patent of the United States is:

A thermocouple for measuring temperatures of confined gases comprising a tubular metallic housing adapted to fit an aperture in the wall of a chamber confining such gases, said housing having a substantially cylindrical bore with an enlarged end portion, a ceramic core extending through said bore and having an enlarged portion fitting within said enlarged portion of said housing, packing means for maintaining a gas-tight relation between said housing and said core, said core having an exposed portion extending a distance from the other end of said housing, and a plurality of pairs of spaced conductors of dissimilar metals positioned within said core in a gas-tight relation therewith, said exposed portion of said core being cut away at a plurality of regions to expose the ends of a corresponding plurality of said pairs of said conductors, said ends of each of said pairs being connected together to form a thermocouple junction.

ROY W. ABBOTT.

REFERENCES CITED

The following references are of record in the file of this patent:

UNITED STATES PATENTS

| Number | Name | Date |
|---|---|---|
| 2,146,082 | McCoy | Feb. 7, 1939 |

OTHER REFERENCES

Kreisinger et al., Trans. A. S. M. E., vol. 39 (1917), pages 111, 112.

Munday: J. Sc. Insts., vol. 21 (1944), page 67.